United States Patent
Vanninen et al.

(10) Patent No.: US 10,667,273 B2
(45) Date of Patent: May 26, 2020

(54) VERSATILE CHANNEL SELECTION PROCEDURE FOR WIRELESS NETWORK

(71) Applicant: KYYNEL OY, Oulu (FI)

(72) Inventors: Teemu Antero Vanninen, Oulu (FI); Matti Petteri Raustia, Oulu (FI)

(73) Assignee: KYYNEL OY, Oulu (FI)

(*) Notice: Subject to any disclaimer, the term of this patent is extended or adjusted under 35 U.S.C. 154(b) by 0 days.

(21) Appl. No.: 15/834,771

(22) Filed: Dec. 7, 2017

(65) Prior Publication Data
US 2018/0167950 A1    Jun. 14, 2018

(30) Foreign Application Priority Data

Dec. 12, 2016 (EP) .................................. 16203397

(51) Int. Cl.
| | |
|---|---|
| *H04W 72/04* | (2009.01) |
| *H04L 27/28* | (2006.01) |
| *H04W 72/02* | (2009.01) |
| *H04W 52/24* | (2009.01) |
| *H04W 72/08* | (2009.01) |
| *H04L 5/00* | (2006.01) |

(52) U.S. Cl.
CPC ........... *H04W 72/082* (2013.01); *H04L 5/006* (2013.01); *H04W 72/085* (2013.01); *H04W 72/0453* (2013.01)

(58) Field of Classification Search
USPC .......................................... 370/252; 375/285
See application file for complete search history.

(56) References Cited

U.S. PATENT DOCUMENTS

| | | | |
|---|---|---|---|
| 4,780,885 A | 10/1988 | Paul et al. | |
| 2007/0021140 A1* | 1/2007 | Keyes, IV | ............. H02J 50/20 455/522 |

(Continued)

FOREIGN PATENT DOCUMENTS

| | | |
|---|---|---|
| EP | 2 721 760 | 4/2014 |
| IL | 67379 A | 11/1985 |
| WO | 2012172162 A1 | 12/2012 |

OTHER PUBLICATIONS

European Search Report for corresponding Application No. EP 16 20 3397, 2 pages, dated Apr. 7, 2017.

(Continued)

*Primary Examiner* — Asad M Nawaz
*Assistant Examiner* — Jason A Harley
(74) *Attorney, Agent, or Firm* — FisherBroyles, LLP (57) ABSTRACT

A method of selecting a frequency block includes determining a first value representing a lowest noise level of a radio channel at a first or second node, calculating a first metric representing a ratio between a first desired signal strength and the first value, determining a second value representing a lowest noise level of a radio channel at the first or second nodes, calculating a second metric representing a ratio between a second desired signal strength and the second value, selecting, on the basis of at least the first and second metrics and amongst a set of frequency blocks including at least the first and second frequency blocks, a frequency block for transmission of a message between the first and second nodes, indicating a sub-band of the selected frequency block, and causing transmission of the message on the indicated sub-band.

17 Claims, 6 Drawing Sheets

(56) References Cited

U.S. PATENT DOCUMENTS

| | | | | |
|---|---|---|---|---|
| 2008/0300002 A1* | 12/2008 | Sheffer | ............... | H04B 1/7097 455/509 |
| 2009/0060081 A1* | 3/2009 | Zhang | ................... | H04L 1/0026 375/267 |
| 2010/0189048 A1* | 7/2010 | Baker | ................... | H04L 5/0037 370/329 |
| 2014/0119316 A1* | 5/2014 | Linden | .................. | H04L 5/0044 370/329 |
| 2014/0316774 A1* | 10/2014 | Wang | ................... | G10L 19/012 704/226 |
| 2016/0165607 A1* | 6/2016 | Hedayat | ............ | H04W 72/0453 370/338 |

OTHER PUBLICATIONS

Extended European Search Report for corresponding Application No. 16 203 397.1, 7 pages, dated Apr. 19, 2017.

\* cited by examiner

CONTROL MESSAGE

Fig 9A

REQUEST-TO-SEND

Fig 9B

CLEAR-TO-SEND

VERSATILE CHANNEL SELECTION PROCEDURE FOR WIRELESS NETWORK

CROSS-REFERENCE TO RELATED APPLICATION

This application claims benefit to European Application No. 16203397.1, filed Dec. 12, 2016, which is incorporated by reference herein in its entirety.

BACKGROUND

Field

The invention relates to the field of long range radio communications and, particularly, to carrying out a frequency channel selection procedure in a radio communication apparatus.

Description of the Related Art

Modern radio communication systems support operation on a frequency channel selected from a plurality of frequency channels according to a determined criterion. Some systems rely on frequency planning where a given frequency band is assigned to the system, and the system is configured to operate exclusively on that frequency band. Such systems are typically based on using licensed frequency bands. Other systems are configured to choose a frequency to be used more adaptively, e.g. on the basis of scanning for the available (non-occupied) frequencies and, then, transferring control messages related to negotiation of the frequency band to be used. Such methods increase signalling overhead, particularly in networks comprising numerous network nodes.

In some systems, a channel is selected for communication after performing channel measurements. The measurements are typically based on a first node transmitting a pilot signal to a second node on a channel and the second node measuring the pilot signal. Such measurements may be carried out for multiple frequency channels and, after the measurements, the nodes may select a channel for bidirectional communication. Such a procedure is applicable to systems where the nodes experience a substantially similar radio environment. In long range communication systems, two geographically distant nodes may experience completely different radio environments, and many conventional channel selection principles are not applicable. Similar phenomena may be experienced even in short and medium range radio communications.

SUMMARY

The invention is defined by the subject-matter of the independent claims.

Embodiments of the invention are defined in the dependent claims.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
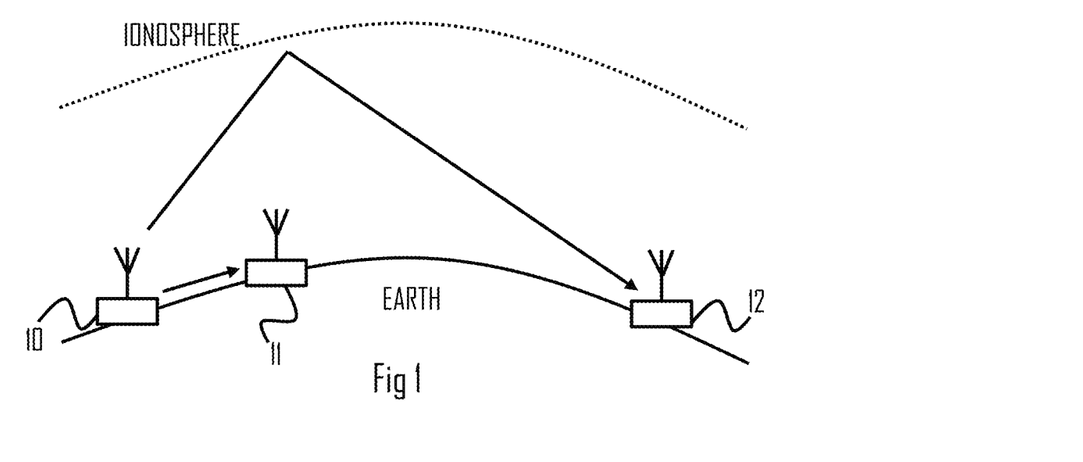
FIG. 1 illustrates a wireless network to which embodiments of invention may be applied.

FIG. 1 illustrates an exemplary wireless telecommunication system to which embodiments of the invention may be applied. Embodiments of the invention may be realized in an ad hoc network comprising a plurality of network nodes 10, 11, 12 that may be realized by radio communication apparatuses. The ad hoc network may refer to a network that is established between the network nodes 10 to 12 without any network planning with respect to the infrastructure and/or frequency utilization. The network nodes may be operationally equivalent to each other although in some embodiments some of the network nodes of the system may operate as access nodes to other network nodes. The term access node may refer to a network access service provided by an access node, wherein the access node provides another network node with radio access to at least one network, e.g. a local area network, a wide area network, and/or the Internet. At least some of the network nodes 10 to 12 are free to move, and they may also be configured to route data packets that are unrelated to their own use, e.g. data packets of other network nodes. However, it should be understood that principles of the invention may be applied to other types of communication systems, e.g. wireless mesh networks, communication systems having a fixed infrastructure such as cellular communication systems, and other types of systems. The principles of the invention may also be applied to point-to-point connections, wherein two network nodes communication directly with each other without using any other network node to route the data packets.

In the embodiment of FIG. 1, the network nodes 10 to 12 have a very long communication range (even thousands of kilometres), and they may communicate directly with network nodes on the other side of the Earth. Their transmit powers may vary from a few Watts (e.g. 20 to 50 W) to even kilo Watts, depending on whether the network node is mobile or fixed and the type of power supply. For example, a network node installed to a building, a truck, or a ship may utilize high transmit powers, while a hand-held device may be limited to a few Watts. The frequency band utilized by the network nodes 10 to 12 may comprise a high frequency (HF) band (3 to 30 MHz or 1.5 to 30 MHz), but it should be understood that other embodiments utilize other frequency bands supporting such long-range radio links, e.g. very high frequencies (VHF) or ultra-high frequencies (UHF). An advantage of HF frequencies is their long propagation range, and the fact that they may propagate via several types of communication paths. FIG. 1 illustrates a scenario where a first network node 10 communicates with a second network node 11 over surface radio waves that propagate close to the ground surface. However, a third network node 12 on the other side of the Earth may be reached by the first network node 10 via radio waves that propagate by utilizing ionospheric reflections. Some network nodes may be reached by using both surface waves and ionospheric reflections.

The network nodes 10 to 12 are configured to support communication on a high frequency band from which actual transmission frequencies may be selected according to embodiments described herein. The supported frequency band may be continuous or divided into a plurality of frequency bands separated from each other. The division may be based on the fact that there are other systems occupying some frequencies that may have a priority to occupy the frequencies, while the present system has to adapt to the frequency occupation of such a primary system. In some embodiments, the systems occupying the same frequency band have equal priority to the frequency occupation, and at least the present system may utilize cognitive channel selection procedures described herein to avoid collisions between the systems.

Figure 2:
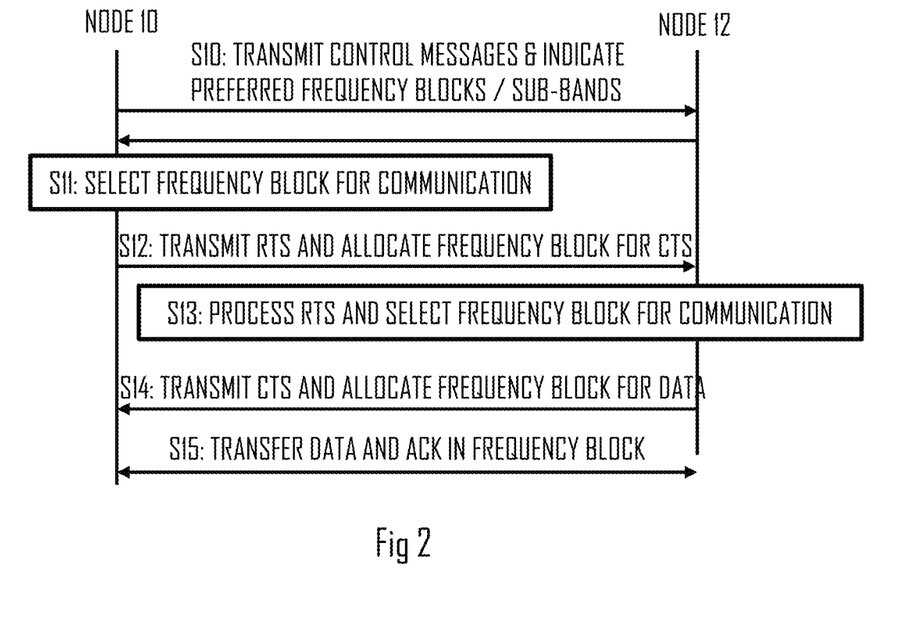
FIG. 2 illustrates a messaging scheme to which some embodiments of the invention may be applied.

FIG. 2 illustrates a flow diagram of a process for a procedure to which some embodiments of the invention may be applied. FIG. 2 illustrates a handshake procedure in which two network nodes 10 and 12 initiate data transmission. The handshake procedure in this embodiment involves exchange of request-to-send (RTS) and clear-to-send (CTS) messages. Referring to FIG. 2, the network nodes may be configured to exchange narrowband control messages with one another in S10. Each control message comprises a pilot sequence and an identifier identifying a transmitter of the control message. In some embodiments, the control message consists of the pilot sequence and the identifier. The exchange of the control messages may be carried out repeatedly according to preset rules that may be time-based and/or need-based. The control messages may be considered as advertisement or discovery messages with which the network nodes indicate their presence in the network and, additionally, indicate preferred frequencies for communication, as described below.

With respect to reception of a single narrowband control message in a network node 10 to 12, the network node may receive a broadband signal through a broadband radio receiver. The broadband radio receiver may be configured to carry out the reception on a frequency band that is significantly broader than a bandwidth of the narrowband control message. In some embodiments, the bandwidth of the receiver may be more than ten times the bandwidth of the narrowband control message, and in other embodiments even hundreds or thousands time the bandwidth of the narrowband control message. The network node may then carry out a signal detection procedure on the received broadband signal so as to detect a narrowband control message within the received broadband signal. The signal detection may be carried out for a plurality of sub-bands of the received broadband signal. For example, the received broadband signal may be divided into a plurality of sub-bands having the bandwidth corresponding to the known bandwidth of the narrowband control message, and the signal detection process may be carried out for each sub-band separately. In practice, the received signal of a given sub-band may be correlated with a pilot sequence stored in a memory of the apparatus. The pilot sequence may be the same as the pilot sequence added to the narrowband control message in its transmitter.

Upon detection of the narrowband control message on a sub-band of the received broadband signal, a transmitter of the narrowband control message may be determined from the identifier comprised in the detected narrowband control message. The network nodes 10 to 12 may be configured to use the narrowband control messages to indicate preferred sub-bands, e.g. the sub-bands providing a communication quality high enough from the perspective of the transmitter of the narrowband control message. In an embodiment, the transmitter may indicate the preferred sub-band by transmitting the narrowband control message on the preferred sub-band. In another embodiment, the narrowband control message comprises an information element having a bit value that indicates the preferred sub-band(s), e.g. a bitmap described below. Therefore, a receiver of the control message may determine from the received control message(s) the sub-band(s) preferred by the transmitter of the narrowband control message.

The term "narrowband" may be defined with respect to the "broadband" such that the bandwidth of the narrowband control message is lower than the bandwidth of a broadband radio receiver. According to another point of view, the narrowband may be defined with respect to its transmission frequency, e.g. the bandwidth of the narrowband control message is 10% or less than the centre frequency carrying the control message. On the other hand, the bandwidth of the broadband radio receiver is higher than 10% of the centre frequency of the control message.

Channel selection is carried out in S11 by the network node 10 having data to transmit to the network node 12. The network node 10 may then initiate a data transmission. Parameters of the data transmission may be negotiated in a negotiation phase in which the network node 10 transmits a RTS message to the network node 12, and the receiver responds with a CTS message. In S12, the transmitter transmits the RTS message to the receiver. The RTS message may specify an amount of resources needed for transmission of the data, a quality-of-service classification for the data, and/or other information that enables the network node 12 to allocate sufficient resources for data transmission. The RTS message may further contain information that enables the network node 12 to select a frequency block for the CTS message. Embodiments of this feature are described below. Upon reception of the RTS message in S12, the receiver detects the RTS message in S13, determines a bandwidth needed for the data transmission, and performs selection of one or more frequency blocks for the data transmission.

In S14, the receiver prepares the CTS message for transmission to the transmitter. The network node 12 may transmit the CTS message on a sub-band of a frequency block indicated in the RTS message in S12, and the CTS message may comprise a frequency block allocation for the subsequent data transmission. In an embodiment, the CTS message may also comprise a sub-band allocation for frequency block(s) indicated in the frequency block allocation.

In S15, the network node 10 carries out the data transmission in the frequency resources allocated in the CTS message. The network node 12 is configured to monitor for those frequency resources for the data transmission. Upon reception of the data transfer on those channels, the network node 12 processes the received data by carrying out data detection and decoding algorithms. Upon successful reception of the data, the network node 12 is configured to transmit an ACK message in a frequency block specified in the RTS message in S12. However, upon erroneous reception of the data, the network node 12 is configured to transmit a NAK message in the frequency block specified in the RTS message in S12. In some embodiments, the network node 12 responds only to the correct reception (ACK) or to the erroneous reception (NAK) of the data. For example, when the network node 12 acknowledges only the correct receptions by transmitting ACK, the network node 10 detects erroneous reception upon detection of no ACK message for a given data packet. Any hybrid automatic repeat request (HARQ) procedures are also possible, wherein upon detecting erroneous reception of a data packet, a retransmission comprises either the same data packet (chase combining) or additional information (e.g. parity bits) that help the decoding in the receiver. The latter embodiment is known as incremental redundancy HARQ. In this manner, the data transfer may continue between the network nodes 10 to 12.

As a result of the above-mentioned channel selection procedure, no manual frequency planning or excessive control signalling related to the negotiation of the common frequency band(s) to be utilized in the communication is necessary. Repeated transmission of the control messages also enables fast adaptation to changing radio environment. Typically, one sub-band may have high quality for a given time period after which other systems occupy the sub-band, and the quality of the sub-band deteriorates. For example, HF frequencies are susceptible to various natural phenomena, e.g. solar activity and other radiations originating from the space, and the other radio systems also contribute to the changing radio environment. Systems with static frequency planning cannot adapt to such changes and, therefore, their performance degrades. Furthermore, the radio environment may be completely different for two network nodes far away from each other. This raises the requirements for the fast adaptation, as the probabilities that at least one of two network nodes experiences degradation of current sub-bands is increased. A network node may, upon detection of poor performance in the currently preferred sub-band(s) and/or frequency block(s), scan for better sub-bands and/or frequency blocks and transmit one or more new control messages indicating an updated list of preferred frequencies. Upon reception of the new control message(s), the other network nodes may update the preferred channel list accordingly. The channel selection process comprising the exchange of the control message(s) and the processing of the received control message(s) may take even less than 200 ms which enables fast adaptation to the changing radio environment and may be carried out even without any negotiation other than the unidirectional transmission of the control message.

Figure 3:
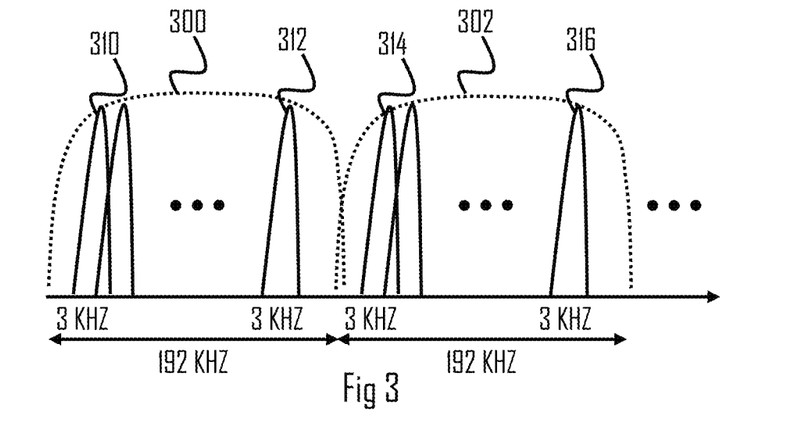
FIG. 3 illustrates a frequency channel structure to which some embodiments of the invention may be applied.

Let us consider a channel structure with reference to FIG. 3. FIG. 3 illustrates that the operational band of the whole system is divided into a plurality of frequency blocks 300, 302, each frequency block 300, 302 having an exemplary 192 kHz bandwidth. Each network node 10 to 12 may be tuned to receive 192 kHz signals of each frequency block. The network node 10 to 12 may comprise a plurality of radio receivers, wherein each radio receiver is tuned to receive radio signals on at least one frequency block. In some embodiments where the number of frequency blocks supported by the system is higher than the number of radio receivers in the network node, at least some of the radio receivers are tuned to receive a plurality of frequency blocks. The radio receivers may then carry out frequency-hopping between said frequency blocks. The bandwidth of the actual transmissions is 3 kHz. Each 192 kHz frequency block is divided to 3 kHz (1 kHz or another bandwidth in other embodiments) sub-bands. In some embodiments, the number of sub-bands in the frequency blocks is the bandwidth of the frequency block divided by the bandwidth of the sub-band, e.g. 192 kHz/3 kHz=64. In such embodiments, the separation between centre frequencies of adjacent sub-bands is equal to the bandwidth of the sub-bands, e.g. 3 kHz. However, in more efficient embodiments, the separation between centre frequencies of adjacent sub-bands is lower than the bandwidth of the sub-bands. This effectively means that the sub-bands overlap in the frequency domain, as illustrated in FIG. 3, but sufficient frequency separation may still be achieved so that adjacent channel interference may be mitigated in the receiver. For example, the centre frequency separation may be 1 kHz or even 500 Hz, while the bandwidth of the sub-band is several kHz. A network node 10 to 12 may be configured to select one or more sub-bands per frequency block to carry out a transmission.

As the transmitter may select the sub-bands on which to transmit the control messages, each broadband receiver do not necessarily know on which one of the sub-bands of the frequency block the transmission is located. As a consequence, each receiver branch may comprise a matched filter matched to a waveform of a known pilot sequence contained in the transmission and, further, be configured to scan for the (3 kHz) sub-bands of the received broadband (192 kHz) signal and to detect the pilot sequence. As known in the art, the matched filters may be replaced by a correlator structure.

Upon detection of the pilot sequence in one of the sub-bands of the received signal, a signal on the sub-band is applied to a control message processor that may be configured to process the signal. The processing may comprise applying receiver signal processing algorithms, e.g. equalization, to the sub-band signal. The pilot sequence contained in the received sub-band signal may be used as a training sequence for the equalization (a channel response may be estimated from the pilot sequence) and for other signal processing algorithms. Then, the control message processor may extract a payload portion of the control message contained in the sub-band signal and recover any payload contained in the payload portion.

Figure 4:
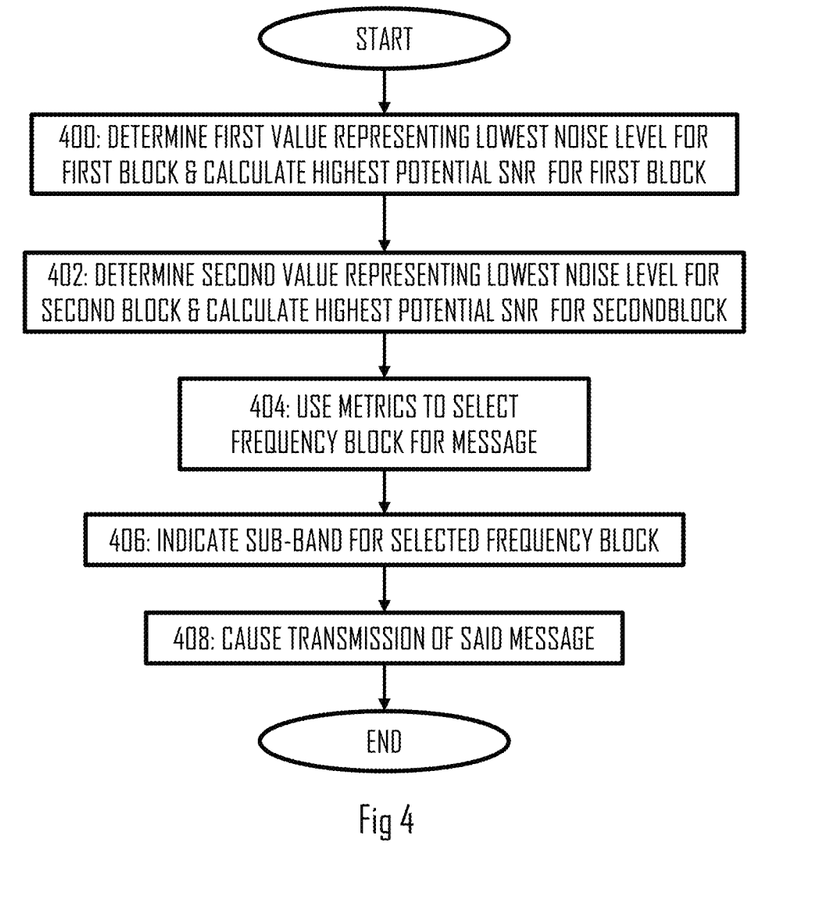
FIG. 4 illustrates a flow diagram of a process for selecting a frequency block and a sub-band for transmission of a message according to an embodiment of the invention.

Some embodiments of the invention described below are applicable to the channel structure of FIG. 3 and the messaging scheme of FIG. 2. FIG. 4 illustrates a process for selecting a frequency block 300, 302 for radio communications, the method comprising in a first node 10 of a wireless network: determining (block 400) a first value representing a lowest noise level of a radio channel at the first node or at a second node 11, 12 in a first frequency block; calculating (block 400) a first metric representing a ratio between a first desired signal strength and the first value, wherein the first metric represents the highest potential signal-to-noise ratio in the first frequency block; determining (block 402) a second value representing a lowest noise level of a radio channel at the first node or at the second node in a second frequency block; calculating (block 402) a second metric representing a ratio between a second desired signal strength and the second value, wherein the second metric represents the highest potential signal-to-noise ratio in the second frequency block; selecting (block 404), on the basis of at least the first and second metric and amongst a set of frequency blocks comprising at least the first and second frequency block, a frequency block for transmission of a message between the first node and the second node; indicating (block 406) a sub-band of the selected frequency block for the message; and causing transmission of the message on the indicated sub-band of the selected frequency block (block 408).

In an embodiment, the first desired signal strength is measured from a first desired signal received in the first node 10, and the second desired signal strength is measured from a second desired signal received in the first node 10, wherein the first desired signal is received in the first frequency block and the second desired signal is received in the second frequency block different from the first frequency block.

In an embodiment, the process of FIG. 4 results in only one metric calculated per frequency block, wherein the metric represents the ratio between the desired signal strength and the lowest noise level in the frequency block. This metric thus represents the best potential signal-to-noise ratio (SNR) that can be achieved for a communication signal transmitted or received in the frequency block. The frequency block selection may thus be carried out by using these estimates of the best potential SNR per frequency block, and the selection in block 404 may include selecting the frequency block that provides the best SNR amongst the frequency blocks, i.e. selecting a frequency block associated with a metric indicating the best potential SNR. The selection of a sub-band within the selected frequency block may be carried out by using another criterion, as described below.

Figure 5:
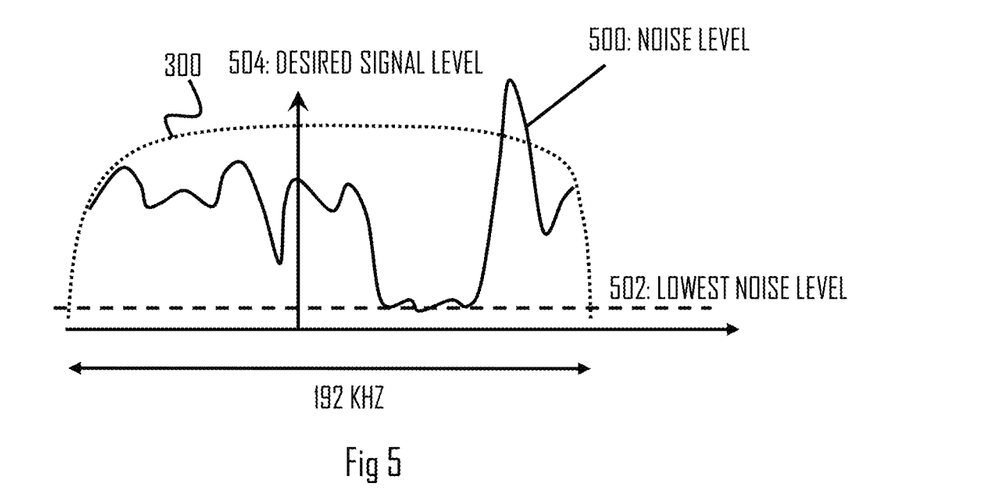
FIG. 5 illustrates an example of noise levels in a frequency block.

FIG. 5 illustrates an example of channel conditions in a frequency block 300 that may be measured in network nodes 10 to 12. The curve drawn with a solid line represents a frequency-dependent noise level 500. The noise level 500 may be affected by background noise (e.g. thermal noise) and other radio transmissions. The background noise may be spectrally substantially white and the noise level may be coloured by the other radio transmissions in the system of the network nodes 10 to 12 and/or by other wireless systems. If there exists at least one radio transmission in the frequency block 300 at the time of measuring the noise level 500, the measured noise level 500 spectrum may be coloured, i.e. be spectrally non-flat. The number of radio transmissions in the frequency block 300 is proportional to the volatility of the measured noise level 500. The embodiment of FIG. 4 is particularly suitable for scenarios where the noise level 500 has a non-flat spectrum in the frequency block 500 because it then enables detection of the best potential SNR achievable in the frequency block instead of just determining whether or not there is interference in the frequency block. Additionally, the embodiment of FIG. 4 enables estimation of the best possible SNR for the frequency block even when the desired signal is not received on a sub-band associated with the lowest noise level. In fact, the desired signal may be received on any one of the sub-bands of the frequency block.

The lowest noise level 502 may be calculated, for example as follows. In an embodiment, the lowest noise level is calculated for a frequency block 300 by first measuring the radio channel on a frequency band of the frequency block 300, thus acquiring a measured radio signal. Then, the measured radio signal may be transformed into a frequency domain by a (fast) Fourier transform, thus resulting in a set of frequency samples. The Fourier-transformed signal may be processed to represent, and the set of frequency samples may represent a frequency response of the radio channel in the frequency block 300, an amplitude spectrum of the radio channel in the frequency block 300, or a power spectrum of the radio channel in the frequency block 300, or another representation of measured frequency characteristics of the radio channel in the frequency block. The lowest noise level may be achieved by selecting the smallest value amongst the frequency samples or another, more sophisticated, algorithm for selecting the lowest noise level may be employed.

FIG. 5 also illustrates the desired signal level 504, i.e. the strength of the desired signal. In an embodiment, the desired signal is measured by the first node from a radio signal received from the second node. In other words, the desired signal strength 504 represents a signal level of a radio signal received at the first node from the second node. The desired signal strength may be measured by using state-of-the-art measurement solutions, e.g. measuring a received signal level from the control messages exchanged in S10 in FIG. 2. The strength of the desired signal may represent only the strength of the desired signal, i.e. without the noise or interfering other radio transmissions affecting the strength. The contribution of only the desired signal to the signal strength (e.g. power) measured from a channel (e.g. a sub-band) may be taken into account by using conventional signal processing tools. For example, a signal strength of a signal received from the channel may be measured at first in a state where the desired signal is detected in the channel. This measured signal strength includes the desired signal component, a noise component, and an interference component. Second, the noise and interference power are estimated in a state where the desired signal is not detected in the channel. The detection of the presence/absence of the desired signal may be carried out by using conventional channel sensing mechanisms. In the third step, these two measurement values are subtracted such that the result is the desired signal strength. The order of the first and second step is naturally interchangeable. The first and second step may be carried out within a determined time window during which the noise and interference components may be assumed as substantially constant or sufficiently static.

In an embodiment, the strength of the desired signal is measured on a frequency different from the frequency of the lowest noise level 502, e.g. a frequency band of the lowest noise level 502 and a frequency band where the desired signal strength 504 is measured may be exclusively different. This enables computation of the potential SNR for the frequency block regardless of the frequency band used for measuring the desired signal strength. This embodiment is described in greater detail below with reference to FIG. 10.

Figure 6:
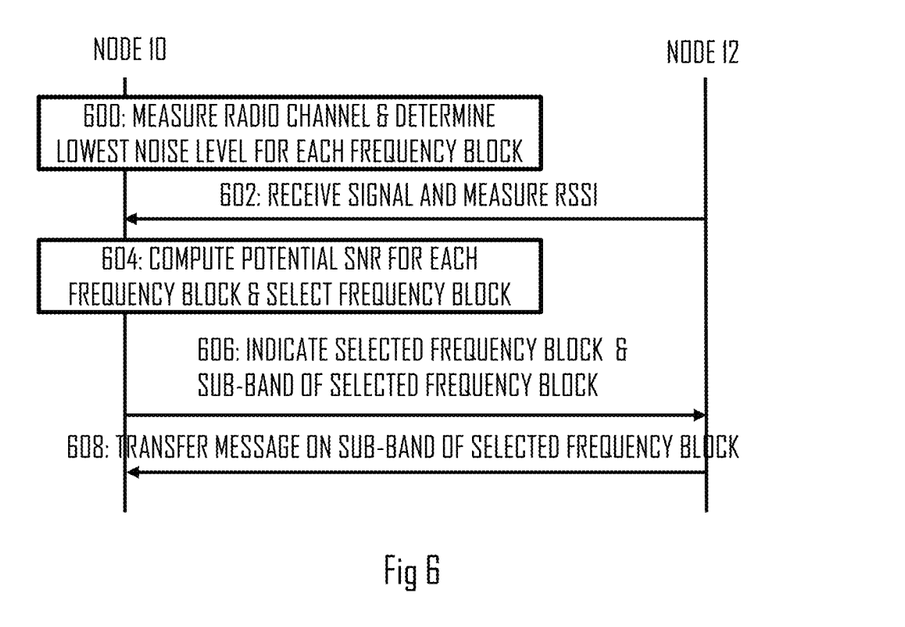
FIG. 6 illustrates an embodiment for computing, by an apparatus, potential signal-to-noise ratios for frequency blocks and selecting a frequency block for a message to be received at the apparatus according to an embodiment of the invention.
Figure 7:
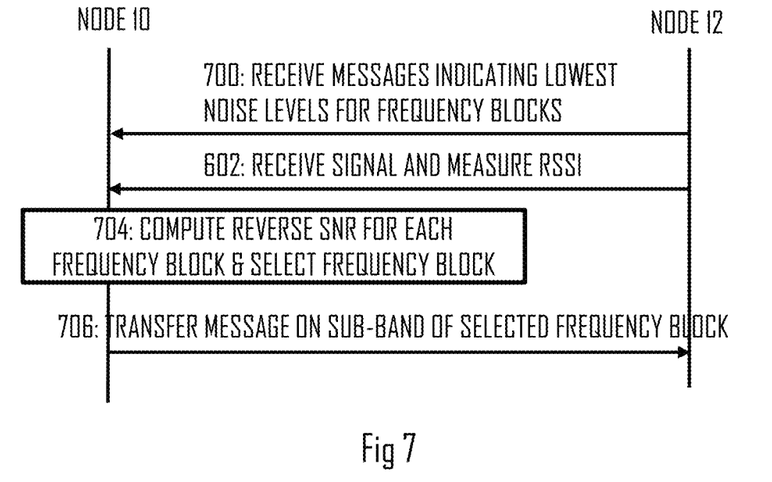
FIG. 7 illustrates an embodiment for computing, by an apparatus, potential signal-to-noise ratios for frequency blocks and selecting a frequency block for a message to be transmitted from the apparatus according to an embodiment of the invention.

Let us now consider some embodiments for carrying out the selection of the frequency block. FIGS. 6 and 7 illustrate signalling diagrams of embodiments where the frequency block is selected by using a recipient of the message of block 408 as a further criterion. In particular, if the recipient is the first node executing the process of FIG. 4, the metrics may be computed by using channel measurements performed by the first node. This is described in connection with FIG. 6 and, in this case, the first node may trigger the second node to transmit the message to the first node in block 408. If the recipient is the second node, the metrics may be computed by using the lowest noise levels for the frequency blocks as received from the second node. This is described in connection with FIG. 7 and, in this case, the first node may transmit the message from the first node to the second node in block 408.

Referring to FIG. 6, the first node is the network node 10 and the second node is the network node 12. In block 600, the network node 10 performs radio channel measurements and computes, on the basis of the measurements, the lowest noise level values $N_k^{10}$ for each of a plurality of frequency blocks 1 to K, thus acquiring values $N_1^{10}$ to $N_K^{10}$. Block 600 may be carried out regularly, e.g. periodically. In step 602, the network node 12 transmits a radio signal in a frequency block k and the network node 10 receives the radio signal and measures a received signal strength $P_k^{rx}$ of this radio signal upon receiving the radio signal. The radio signal may carry a control message such as that described above in connection with S10 of FIG. 2. The radio signal may be transmitted on any sub-band of the frequency block k. The signal strength may be measured from a pilot sequence part comprised in the message. The received signal strength $P_k^{rx}$ may be a received signal strength indicator (RSSI) that represents a power of the received radio signal in the frequency block k, although another metric representing the signal strength may be used (e.g. amplitude or energy). Step 602 may precede block 600 in some cases. Block 602 may be carried out for a plurality of frequency blocks in which the radio signal or another radio signal from the network node 12 has been received. In a case where the network node 12 transmits the radio signal in every frequency block 1 to K, $P_k^{rx}$ may be computed by the network node 10 for every frequency block 1 to K. In other embodiments, the network node 10 may receive the radio signal in a subset of the frequency blocks 1 to K and, then, the network node 10 may compute the $P_k^{rx}$ only for the subset of frequency blocks.

In block 604, the network node 10 computes the potential SNR for each frequency block for which $P_k^{rx}$ has been measured and for transmissions from the network node 12 to the network node 10 as:

$$SNR_1^{12\to 10} = \frac{P_1^{rx}}{N_1^{10}}, SNR_2^{12\to 10} = \frac{P_2^{rx}}{N_2^{10}}, \ldots , SNR_K^{12\to 10} = \frac{P_K^{rx}}{N_K^{10}}$$

Then, the frequency block providing the highest $SNR_k^{12\to 10}$ may be selected in block 604. Upon selecting the frequency block, the network node may generate a message for transmission to the network node 12 and insert into the message an index of the selected frequency block to indicate to the network node the frequency block in which the network node 12 shall transmit a subsequent message to the network node 10. In an embodiment, the message generated and transmitted by the network node 10 in step 606 is the RTS message (see S12 in FIG. 2). In another embodiment, the message generated and transmitted by the network node 10 in step 606 is another request message or another message requiring a response from the network node 12. The message may be a data packet requiring an acknowledgment (ACK/NAK), for example.

The network node 10 may further indicate with the message generated and transmitted in step 606 a preferred or even a selected sub-band within the selected frequency block. In an embodiment, described in greater detail below, the network node 10 may insert into the message an information element indicating sub-band(s) within the selected frequency block. The network node may thus specify a sub-band and a frequency block in which it shall receive the response to the RTS message. Accordingly, the network node may include in the message separate information elements for the selected frequency block and for preferred sub-band(s) within the frequency block.

The RTS message may further include a bitmap that indicates preferred sub-bands for the frequency block in which the RTS message is transmitted. The bitmap may serve the same purpose as in the control message of S10, e.g. as an indicator of one or more sub-bands in which another node can contact the network node 10.

Upon receiving the message in step 606, the network node 12 may generate a response to the message. The network node may select the frequency block indicated in the message received in step 606. The network node 12 may further select a sub-band indicated as the preferred or selected sub-band in the message received in step 606. If multiple sub-bands are indicated as preferred sub-bands, the network node 12 may select a sub-band arbitrarily, e.g. randomly. If a single sub-band is explicitly specified in the message, the network node 12 is obliged to select the sub-band. The network node may transmit the response message in step 608 on the selected sub-band of the selected frequency block. The response message may be the CTS message described above in S14 or an acknowledgment message, for example.

Referring to the embodiment of FIG. 4, the indication of the sub-band in block 406 is the indication of the preferred sub-band(s) in step 606, and block 408 may comprise the transmission of the message in step 606 that triggers (causes) the transmission of the message referred to in block 408. The message of block 408 may be the response to the message transmitted in step 606.

In the embodiment of FIG. 6, the network node 10 selects the frequency block for a message it is bound to receive from the network node 12. FIG. 7 illustrates an embodiment where the network node 10 selects a frequency block for a message it is about to transmit to the network node 12. In this embodiment, the network node 10 uses information on channel conditions (a noise level) in the other network node 12. Let us remind that the system is applicable to long-range communications and, accordingly, two distant network nodes 10 12 may observe totally different channel conditions. When communicating on the HF, a majority of the received noise origins from the radio channel and, thus, even two nodes quite close to one another, e.g. a distance of only a few miles or hundreds of yards, could experience completely different radio spectra due to local interference and noise sources. If the network node 10 would select a frequency block on the basis of the channel measurements made in block 600, the network node 10 could select a frequency block providing poor SNR conditions at the network node 12. Therefore, it is advantageous for the network node 10 to utilize channel information received from the network node 12.

Referring to FIG. 7, the network node 12 may carry out block 600, perform the radio channel measurements and computes, on the basis of the measurements, the lowest noise level values $N_k^{12}$ for each of a plurality of frequency blocks 1 to K, thus acquiring values $N_1^{12}$ to $N_K^{12}$. The network node 12 may then transmit the values $N_1^{12}$ to $N_K^{12}$ to the network node 10 in step 700. Block 600 and step 700 may be carried out regularly for every frequency block, e.g. periodically. The values $N_1^{12}$ to $N_K^{12}$ may be transmitted in a control message of step S10, for example. In an embodiment, the node 12 transmits the control message in every frequency block it has observed as potential for reception of a message. A frequency block may be determined to be potential for reception of a message, if the lowest noise level computed for the frequency block is below a determined threshold. In other embodiments, the control message may be transmitted in all frequency blocks, or another rule for selecting the frequency blocks for transmission of the control message may be employed.

In an embodiment, each control message indicates the lowest noise level for the frequency block in which the control message is transmitted. In an embodiment, each control message indicates the lowest noise level for only the frequency block in which the control message is transmitted. In an embodiment, the network node may indicate with the control message generated and transmitted in step 700 a preferred sub-band within the frequency block conveying the control message. As described in connection with FIG. 6, the network node 12 may insert into the control message an information element indicating preferred sub-band(s) within the selected frequency block. A bitmap may be used to indicate the preferred sub-bands.

The network node 10 may receive the control message(s) indicating the lowest noise levels for the frequency blocks in 700 and, upon measuring the signal strength of one or more radio signals received from the network node in frequency blocks in step 602, the network node 10 may compute the potential SNR for the frequency blocks and for a message to be transmitted from the network node 10 to the network node 12 in block 704 as:

$$SNR_1^{10 \to 12} = \frac{P_1^{rx}}{N_1^{12}}, SNR_2^{10 \to 12} = \frac{P_2^{rx}}{N_2^{12}}, \ldots, SNR_K^{10 \to 12} = \frac{P_k^{rx}}{N_K^{12}}$$

In this case, the network node 10 may assume the radio channel to be reciprocal in the sense that a radio signal transmitted from the network node 12 to the network node 10 attenuates in a similar manner as a radio signal transmitted from the network node 10 to the network node 12. Accordingly, the network node may employ the signal strength of a signal received in step 602 from the network node 12 in computation of the potential SNR at the network node 12 for a signal transmitted by the network node 10. The network node 10 may compute the potential SNR for every frequency block for which the noise value has been received in step 700. This potential SNR may also be called reversed potential SNR in the sense that the network node 10 computes the potential SNR for the radio environment of another network node, i.e. the network node 12.

The frequency block providing the highest $SNR_k^{10 \to 12}$ may be selected in block 704. Upon selecting the frequency block, the network node may generate a message for transmission to the network node 12 and transmit the message on a sub-band of the selected frequency block to the network node 12 in step 706. The sub-band may be selected by using the information on the preferred sub-bands in the selected frequency blocks, as indicated by the network node 12 in the control message(s) exchanged in step 700 or S10.

Referring to the embodiment of FIG. 4, the indication of the sub-band in block 406 is the selection of the preferred sub-band(s) for the message transmitted in step 706, and block 408 may comprise the transmission of the message in step 706. Accordingly, block 408 comprises causing the transmission of the message from the network node 10.

In an embodiment, the message transmitted in step 706 is the RTS message described above in connection with S12 of FIG. 2. The RTS may be addressed to a network node with which the network node 10 wishes to initiate data transmission.

In an embodiment, the message transmitted in step 706 is the control message described above in connection with S10 of FIG. 2. The network node 10 may keep a list of other network nodes of the wireless network and select the frequency block and the sub-band for the control message such that the probability of receiving the control messages correctly in the network nodes of the wireless network is improved. This may be achieved by selecting the frequency block which indicates the best potential SNR for one or more receivers of the control message(s) transmitted by the network node 10.

Figure 8:
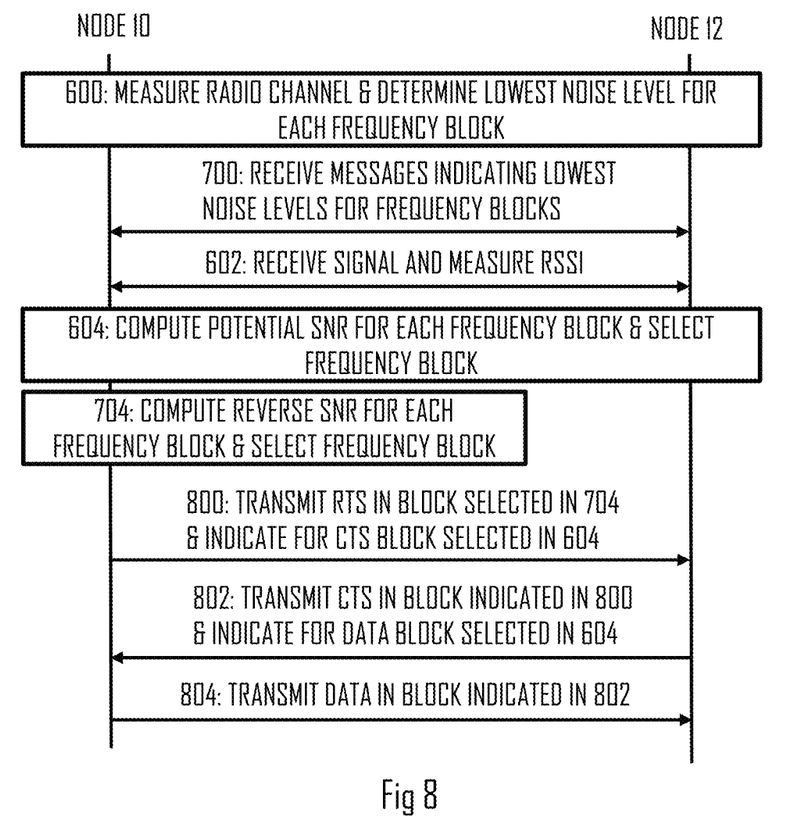
FIG. 8 illustrates an embodiment combining the embodiments of FIGS. 6 and 7.

FIG. 8 illustrates an embodiment that combines the embodiments of FIGS. 6 and 7. FIG. 8 also illustrates system level operation in greater detail than FIGS. 6 and 7 that illustrate the operation mainly from the perspective of the network node 10. Referring to FIG. 8, both or all network nodes of the wireless network may be configured to perform block 600: measure the radio channel and determine lowest noise levels for frequency blocks 300, 302 of the wireless networks. Block 600 may be carried out periodically.

All the network nodes may also carry out step 700 in connection with the exchange of the control messages of S10. As described above, each control message may indicate the lowest noise level for the frequency block in which the control message is transmitted and from the perspective of the transmitter of the control message. In some embodiments, a control message may comprise a bundle of lowest noise level values for a plurality of frequency blocks. Each of the control messages exchanged in step 700 may further carry information on preferred sub-bands of the frequency block in which the control message was transmitted, e.g. a bitmap described below. The exchange of the control messages further enables measuring the received signal strengths in step 602. On the basis of the information gained in block 600 and received in steps 700 and 602, the network node 10 (and the other network nodes) gain information that enables computation of the potential SNR metrics described above and, furthermore, gain information on preferred sub-bands of the other network nodes.

In block 604, the network nodes 10, 12 may compute the potential SNR metrics for the frequency blocks and select a frequency block preferred for reception of messages. The preferred frequency block may be stored in a memory of the respective network nodes 10, 12. Upon determining to initiate communication with the network node 12, e.g. for the purpose of transmitting data to the network node 12, the network node 10 computes in block 704 the reversed SNR metrics for the frequency blocks and selects a frequency block the network node 12 is deemed to provide the best potential SNR at the network node 12, e.g. by selecting the frequency block associated with the highest reversed SNR metric.

In step 800, the network node 10 generates a message (an RTS message) and inserts into the message an information element indicating the frequency block selected by the network node 10 in block 604. The network node 10 may also include in the message information on the preferred sub-band(s) or a selected sub-band within the frequency block selected by the network node 10 in block 604. Then, the network node 10 transmits the message on a sub-band of the frequency block selected in block 704. The sub-band may be selected by using the information on the preferred sub-bands of the selected frequency block received in step 700.

Upon receiving the message in step 800, the network node 12 may extract the contents of the message and generate a response to the message (a CTS message). The network node 12 may insert into the response message an information element indicating the frequency block selected by the network node 12 in block 604. The network node 12 may also include in the message information on the preferred or selected sub-band(s) within the frequency block selected by the network node 12 in block 604. Then, the network node 12 transmits in step 802 the response message on a sub-band of the frequency block indicated by the network node 10 in the information element contained in the message received in step 800. The network node 12 may select the sub-band by using the information on the preferred sub-bands of the frequency block indicated in the received RTS message in step 800. In an alternative embodiment where the RTS message received in step 800 allocates a single sub-band for the response message, the network node 12 may select the sub-band allocated in the RTS message. In yet another embodiment where the RTS message specifies no sub-band, the network node 12 may use the information on preferred sub-bands as received in step 700 select the sub-band on the basis of the information on the preferred sub-bands of the indicated frequency block.

In an embodiment, the response message indicates a plurality of frequency blocks for the data transmission. For example, the message transmitted in step 800 may request for a certain amount of data transmission resources for the transmission of the data. The network node 12 may use the request to determine the number of sub-bands and the number of frequency blocks needed to comply with the request, and select the frequency blocks in block 604. The network node 12 may then insert into the response message of step 802 multiple information elements that indicate the selected frequency blocks.

Upon receiving the response message in step 802, the network node 10 may extract the contents of the response message and determine whether or not the response message (CTS) approves the data transmission from the network node 10 to the network node 12. Upon determining that the data transmission may be commenced, the network node 10 may generate a data message. The network node 10 may insert into the data message payload data and transmit the data message in step 804. The network node 10 may transmit the data message on one or more sub-bands of the one or more frequency blocks indicated by the network node 12 in the information element contained in the response message received in step 802. In an embodiment where the network node has allocated one or more sub-band(s) for the data transmission and specified them in the CTS message, the network node 10 selects the allocated sub-band(s). In another embodiment, the network node 10 may select the sub-band(s) by using the information on the preferred sub-bands of the indicated frequency block(s) received in step 802 or use the information on the preferred sub-bands of the indicated frequency block(s) received in step 700.

In an embodiment, the data message carries the information element indicating the frequency block selected by the network node 10 in block 604. The network node 10 may also include in the message information on the preferred sub-band(s) within the frequency block selected by the network node 12 in block 604. This frequency block and the sub-band may be used by the network node 12 for transmitting an acknowledgement message for the data message. However, in another embodiment, the message of step 800 readily indicates the preferred or selected frequency block of the network node 10, and the network node 12 may select the frequency block and the sub-band of the frequency block for the acknowledgment message on the basis of the information received in step 800. In other words, the RTS message of step 800 may allocated the frequency block and the sub-band for the acknowledgment message.

Figure 9A:
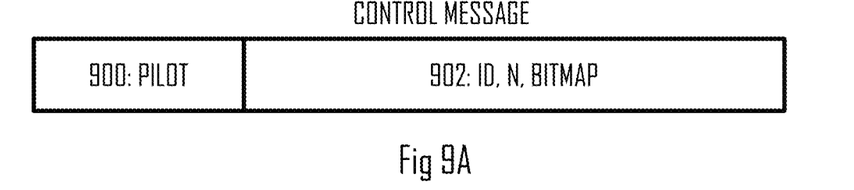
FIGS. 9A to 9C illustrate embodiments of messages exchanged in the embodiments of FIGS. 4 and 6 to 8.
Figure 9B:
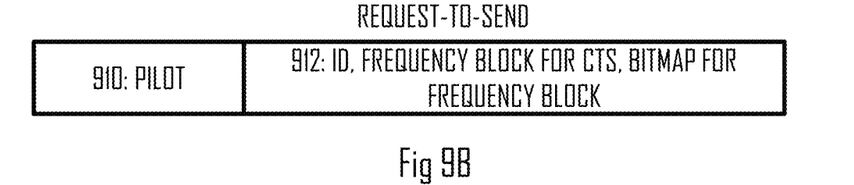
Figure 9C:
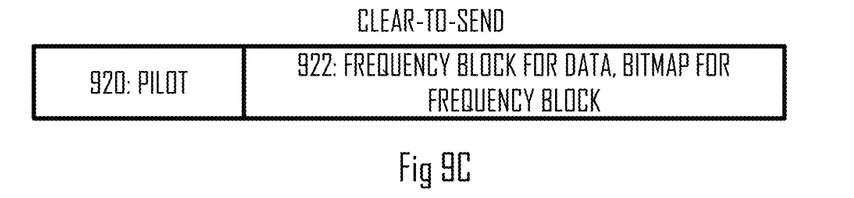

FIGS. 9A to 9C illustrate embodiments of the messages transferred in the wireless network. FIG. 9A illustrates an example of the control message communicated in steps S10, 602, and 700. The control message may comprise a header carrying a pilot sequence 900. The pilot sequence 900 may be used to measure the signal strength in step 602, for example. The pilot sequence may be used for other purposes as well, such as for channel estimation used in equalization in a receiver of the control message. The control message may further comprise information elements 902 such as an identifier (ID) of a transmitter of the control message, the lowest noise level $N_k$ for one or more frequency blocks measured by the transmitter, as described in connection with step 700. The control message may further carry an information element indicating explicitly preferred sub-bands of one or more frequency blocks, e.g. the frequency block carrying the control message. Table 1 below illustrates an example of the information element in the form of a bitmap:

TABLE 1

| Sub-band index: | 1 | 2 | 3 | ... | K |
|---|---|---|---|---|---|
| Preferred (Yes/No) | 1 | 0 | 0 | ... | 1 |

The information element may consists of the K bits indicating the preference for each sub-band in the form of binary value. The order of the K bits is associated with the order of the sub-bands in the frequency block, from the lowest frequency towards the highest frequency or vice versa. A first binary value (e.g. "1") may indicate that a sub-band is preferred and the opposite binary value (e.g. "0") may indicate that a sub-band is not preferred.

The bitmap or another information element indicating the preferred sub-band(s) other than the one carrying the control message provides versatility to the selection of the frequency blocks and sub-bands. Since the transmitter of the control message does not need to indicate the preferred sub-band by transmitting the control message on the preferred sub-band, the transmitter may select the frequency block by using the reversed potential SNR metric and/or the sub-band by using a bitmap received from another network node. In this manner, the transmitter may improve the probability of correct reception of the control message in the other network node(s). The control messages may be considered as pilot messages that each network node transmits periodically or in another regular manner.

FIG. 9B illustrates an embodiment of the RTS message. The RTS message may also carry a pilot sequence 910 that may be used to measure the signal strength in step 602, for example. The RTS message may further comprise information elements 912 such as an identifier of the transmitter of the RTS message, an indicator for the frequency block selected in block 604 and, optionally, a bitmap of preferred sub-bands for the frequency block selected in block 604. In another embodiment, the RTS message may comprise a bitmap of preferred sub-bands for the frequency block carrying the RTS message. The RTS message may further include an information element explicitly specifying a sub-band of the indicated frequency block that shall be used for transmitting the response to the RTS message (the CTS message). This information element may serve also as an indicator for the sub-band of the acknowledgment message related to a subsequent data transmission. The bitmap contained in the RTS message is not necessarily used for selecting a sub-band for the response to the RTS message. Any node may be capable of receiving the RTS message so the bitmap may serve the same purpose as in the control message in step 700. The RTS message may further carry an information element that indicates an amount of data transmission resources requested by the network node transmitting the RTS message. A recipient of the RTS message may use this information in the selection and allocation of a number of sub-bands for the data transmission.

FIG. 9C illustrates an embodiment of the CTS message. The CTS message may also carry a pilot sequence 920. The CTS message may further comprise information elements 922 such as an indicator for the frequency block selected in block 604 for the data transmission and an indicator for one or more sub-bands of the selected frequency block allocated for data transmission. The bitmap may be omitted from the CTS message.

As indicated above in connection with FIG. 5, the lowest noise level estimated for a frequency block may be associated with a sub-band different from a sub-band on which the radio signal used for measuring the $P_{rx}$ is received. The sub-bands may naturally be the same but the sub-bands need not to be the same for the estimation of the potential SNR. In an embodiment, a criterion may be defined that the sub-bands shall belong to the same frequency block. Compared with some conventional methods, a purpose of the calculation of the potential SNR is not to estimate a SNR for a frequency band where a pilot/reference signal is received but to find a sub-band where the SNR is the highest without requiring transmission of the pilot/reference signal on all candidate sub-bands.

Figure 10:
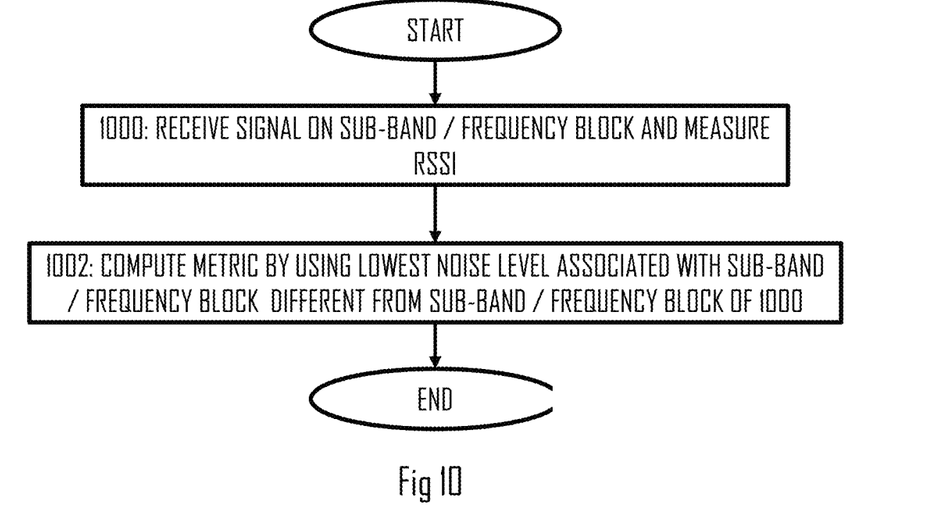
FIG. 10 illustrates an embodiment for versatile computation of the potential signal-to-noise ratios for multiple frequency blocks.

FIG. 10 illustrates a process for estimating the potential SNR as an embodiment of block 604 or 704. Referring to FIG. 10, an apparatus suitable for a network node 10 to 12 receives a signal on a sub-band of a frequency block k and measures the received signal strength $P_k^{rx}$ from the received signal. As described above, the signal may be received in S10, 602, 606 (by the network node 10), 700, or 800 (by the network node 12). In block 1002, the apparatus computes the potential SNR value $SNR_k$ for the frequency block k on the basis of the received signal strength value $P_k^{rx}$ computed in block 1000 and the lowest noise level value available for the frequency block k. The lowest noise level value is in this embodiment associated with a different sub-band than the sub-band where the signal was received and for which the received signal strength $P_k^{rx}$ is measured. The lowest noise level may, however, be present on the sub-band where the received signal strength was measured. A similar procedure may be carried out for every frequency block where a node 10/12 has received a radio signal from the other node 12/10 of the wireless network.

Figure 11:
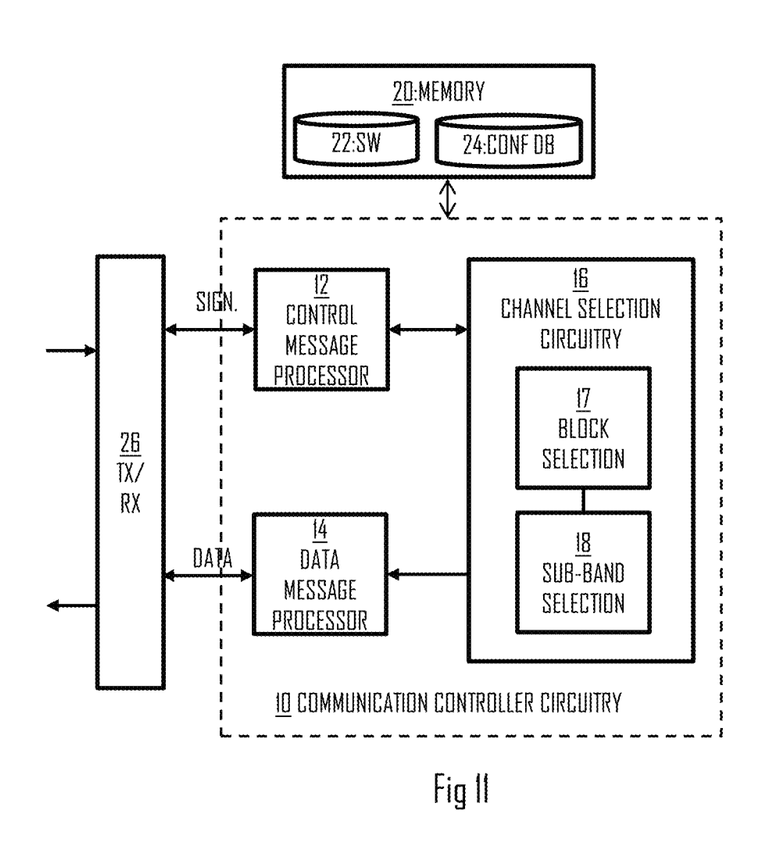
FIG. 11 illustrates a block diagram of a structure of an apparatus according to an embodiment of the invention.

FIG. 11 illustrates an embodiment of an apparatus comprising means for carrying out the functionalities of the network node according to any one of the above-described embodiments. The apparatus may be a radio communication apparatus implemented as a portable device, e.g. a computer (PC), a laptop, a tabloid computer, a portable radio phone, a mobile radio platform (installed to a vehicle such as a truck or a ship), or any other apparatus provided with radio communication capability. In some embodiments, the apparatus is the vehicle equipped with the radio communication capability. In other embodiments, the apparatus is a fixed station, e.g. a base station. In further embodiments, the apparatus is comprised in any one of the above-mentioned apparatuses, e.g. the apparatus may comprise a circuitry, e.g. a chipset, a processor, a micro controller, or a combination of such circuitries in the apparatus.

The apparatus may comprise a communication controller circuitry 10 configured to control the communications in the apparatus. The communication controller circuitry 10 may comprise a control message processor 12 handling control signalling communication with respect to establishment, operation, and termination of the radio connections. The control message processor 12 may also carry out any other control functionalities related to the operation of the radio links, e.g. transmission, reception, and extraction of the control messages in steps S10, 602, 700, and the RTS/CTS messages in steps S12, S14, 606, 608, 706, 800, 802. The communication controller circuitry 10 may further comprise a data message processor 14 that handles transmission and reception of payload data over the radio links, e.g. in steps S15, 804. The communication controller circuitry 10 may further comprise a channel selection circuitry 16 configured to select a preferable frequency block and/or a preferable sub-band for various messages transmitted and/or received by the apparatus. The channel selection circuitry 16 may execute the process of FIG. 4 or any one of its embodiments, for example.

The channel selection circuitry 16 may comprise a frequency block selection circuitry 17 configured to select a frequency block for a message transmitted/received by the apparatus. For a message to be transmitted from the apparatus, the frequency block selection circuitry 17 may first determine whether or not there has already been allocated a frequency block to the message. The determination may comprise checking whether or not the apparatus has received a message through the control message processor 12 that indicates the frequency block for the message. An example of such a situation is that the apparatus has received an RTS message that allocates the frequency block and a sub-band for a responding CTS message the apparatus is currently preparing for the transmission. In such a case, the frequency block selection circuitry 17 may select the frequency block indicated in the received RTS message. If no allocation of the frequency block has been made, the frequency block selection circuitry may compute or determine the reversed potential SNR values according to block 704 for an intended recipient of the message and select a frequency block, as described above in connection with block 704. Upon selecting the frequency block, the frequency block selection circuitry 17 may output information on the selected frequency block to a sub-band selection circuitry 18 configured to select a sub-band of the frequency block for the message. The sub-band selection circuitry 18 may employ information on the preferred sub-bands received from the intended recipient of the message, e.g. the bitmap of Table 1, or received allocation information allocating a sub-band for transmission. Upon selecting the frequency block and the sub-band, the channel selection circuitry 16 may output information on the selection to either control message processor 12 or the data message processor 14, depending on whether the message is a control message or a data message, and the respective processor 12, 14 may carry out transmission of the message.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise a memory 20 that stores computer programs (software) 22 configuring the apparatus to perform the above-described functionalities of the network node. The memory 20 may also store communication parameters and other information needed for the radio communications. For example, the memory may store a list of preferred sub-bands, received signal strength values, and lowest noise level values of frequency blocks for each network node the apparatus has detected or has capability of communicating with. The memory 20 may serve as a buffer for data packets to be transmitted. The apparatus may further comprise radio interface components 26 providing the apparatus with radio communication capabilities with other network nodes. The radio interface components 26 may comprise standard well-known components such as amplifier, filter, frequency-converter, analog-to-digital (A/D) and digital-to-analog (D/A) converters, (de)modulator, and encoder/decoder circuitries and one or more antennas. The apparatus may further comprise a user interface enabling interaction with the user. The user interface may comprise a display, a keypad or a keyboard, a loudspeaker, a smartcard and/or fingerprint reader, etc.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory (ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the steps of any one of the processes of FIGS. 2 to 10. Accordingly, the at least one processor, the memory, and the computer program code form processing means for carrying out embodiments of the present invention in the communication apparatus.

The processes or methods described in FIGS. 2 to 10 may also be carried out in the form of a computer process defined by a computer program. The computer program may be in source code form, object code form, or in some intermediate form, and it may be stored in some sort of carrier, which may be any entity or device capable of carrying the program. Such carriers may include transitory or non-transitory media such as a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to radio communication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

What is claimed is:

1. A method for selecting a frequency block for radio communications, the method comprising in a first node of a wireless network:
   determining a first value representing a lowest noise level of a radio channel at the first node or at a second node in a first frequency block;
   calculating a first metric representing a ratio between a first desired signal strength and the first value, wherein the first metric represents the highest potential signal-to-noise ratio in the first frequency block and the first desired signal is measured on a frequency different from the frequency of the lowest noise level;
   determining a second value representing a lowest noise level of a radio channel at the first node or at the second node in a second frequency block;
   calculating a second metric representing a ratio between a second desired signal strength and the second value, wherein the second metric represents the highest potential signal-to-noise ratio in the second frequency block;
   selecting, on the basis of at least the first and second metric and amongst a set of frequency blocks comprising at least the first and second frequency block, a frequency block for transmission of a message between the first node and the second node;
   indicating a sub-band of the selected frequency block for the message; and
   causing transmission of the message on the indicated sub-band of the selected frequency block, wherein the first value and the second value are measured at the first node and represent the lowest noise level of the radio channel at the first node, wherein the first metric is calculated on the basis of the first value and a reception signal strength of a first signal received from the second node, and the second metric is calculated on the basis of the second value and a reception signal strength of a second signal received from the second node.

2. The method of claim 1, wherein said selecting the frequency block is performed for the transmission of said message that is transmitted from the second node to the first node.

3. The method of claim 2, further comprising transmitting to the second node a second message comprising an information element indicating the selected frequency block for said message that is transmitted from the second node to the first node.

4. The method of claim 1, wherein the first value and the second value are received at the first node from the second node and represent the lowest noise level of the radio channel at the second node.

5. The method of claim 4, wherein the first metric is calculated on the basis of the first value and a reception signal strength of a first radio signal received at the first node from the second node, and the second metric is calculated on the basis of the second value and the reception signal strength of a second radio signal received at the first node from the second node.

6. The method of claim 4, wherein said selecting the frequency block is performed for the transmission of said message that is transmitted from the first node to the second node.

7. The method of claim 6, further comprising:
determining a third value representing a lowest noise level of a radio channel at the first node in a third frequency block;
calculating a third metric representing a ratio between the third value and a reception signal strength of a third radio signal received at the first node from the second node, wherein the third metric represents the highest potential signal-to-noise ratio in the third frequency block;
determining a fourth value representing a lowest noise level of a radio channel at the first node in a fourth frequency block; and
calculating a fourth metric representing a ratio between the fourth value and the reception signal strength of a fourth radio signal received at the first node from the second node, wherein the fourth metric represents the highest potential signal-to-noise ratio in the fourth frequency block;
selecting, on the basis of at least the third and fourth metric and amongst a set of frequency blocks comprising at least the third and fourth frequency block, a frequency block for transmission of a third message from the second node to the first node.

8. The method of claim 7, further comprising:
transmitting to the second node a fourth message comprising an information element indicating the selected frequency block for said third message; and
receiving the third message from the second node in the frequency block indicated in the fourth message.

9. The method of claim 1, wherein said indicating the sub-band of the selected frequency block for the message comprises selecting the sub-band, wherein the selection is based on information on sub-bands that are deemed to be free of colliding transmissions at a receiver of the message.

10. The method of claim 9, wherein the information is received in the first node from the second node as a bitmap, wherein the bitmap indicates for each sub-band of at least said first and second frequency block, whether or not said each sub-band is preferred by the second node for transmission of messages from the first node to the second node.

11. An apparatus comprising:
at least one processor and at least one memory including a computer program code, wherein the at least one memory and the computer program code are configured, with the at least one processor, to cause the apparatus to perform operations comprising:
determining a first value representing a lowest noise level of a radio channel in a first frequency block at a first node or at a second node of a wireless network;
calculating a first metric representing a ratio between a first desired signal strength and the first value, wherein the first metric represents the highest potential signal-to-noise ratio in the first frequency block and the first desired signal is measured on a frequency different from the frequency of the lowest noise level;
determining a second value representing a lowest noise level of a radio channel at the first node or at the second node in a second frequency block;
calculating a second metric representing a ratio between a second desired signal strength and the second value, wherein the second metric represents the highest potential signal-to-noise ratio in the second frequency block;
selecting, on the basis of at least the first and second metric and amongst a set of frequency blocks comprising at least the first and second frequency block, a frequency block for transmission of a message between the first node and the second node;
indicating a sub-band of the selected frequency block for the message; and
causing transmission of the message on the indicated sub-band of the selected frequency block, wherein the first value and the second value are measured at the first node and represent the lowest noise level of the radio channel at the first node, wherein the first metric is calculated on the basis of the first value and a reception signal strength of a first signal received from the second node, and the second metric is calculated on the basis of the second value and a reception signal strength of a second signal received from the second node.

12. The apparatus of claim 11, further comprising:
causing the first node to transmit to the second node a second message comprising an information element indicating the selected frequency block for a message that is transmitted from the second node to the first node.

13. The apparatus of claim 11, further comprising:
receiving the first value and the second value from the second node; and
representing the lowest noise level of the radio channel at the second node.

14. The apparatus of claim 13, further comprising:
calculating the first metric on the basis of the first value and a reception signal strength of a first radio signal received at the first node from the second node; and
calculating the second metric on the basis of the second value and the reception signal strength of a second radio signal received at the first node from the second node.

15. The apparatus of claim 11, further comprising:
carrying out said indication of the sub-band of the selected frequency block for the message by at least selecting the sub-band, wherein the selection is based on information on sub-bands that are deemed to be free of colliding transmissions at a receiver of the message.

16. The apparatus of claim 15, wherein the information is received from the second node as a bitmap, wherein the bitmap indicates for each sub-band of at least said first and second frequency block, whether or not said each sub-band is preferred by the second node for transmission of messages from the first node to the second node.

17. A computer program product embodied on a non-transitory distribution medium readable by a computer and comprising program instructions that, when executed by the computer, perform a computer process in a first node of a wireless network, the computer process comprising:
    determining a first value representing a lowest noise level of a radio channel at the first node or at a second node in a first frequency block;
    calculating a first metric representing a ratio between a first desired signal strength and the first value, wherein the first metric represents the highest potential signal-to-noise ratio in the first frequency block and the first desired signal is measured on a frequency different from the frequency of the lowest noise level;
    determining a second value representing a lowest noise level of a radio channel at the first node or at the second node in a second frequency block;
    calculating a second metric representing a ratio between a second desired signal strength and the second value, wherein the second metric represents the highest potential signal-to-noise ratio in the second frequency block;
    selecting, on the basis of at least the first and second metric and amongst a set of frequency blocks comprising at least the first and second frequency block, a frequency block for transmission of a message between the first node and the second node;
    indicating a sub-band of the selected frequency block for the message; and
    causing transmission of the message on the indicated sub-band of the selected frequency block, wherein the first value and the second value are measured at the first node and represent the lowest noise level of the radio channel at the first node, wherein the first metric is calculated on the basis of the first value and a reception signal strength of a first signal received from the second node, and the second metric is calculated on the basis of the second value and a reception signal strength of a second signal received from the second node.

\* \* \* \* \*